United States Patent [19]
Eldridge

[11] Patent Number: 5,753,888
[45] Date of Patent: May 19, 1998

[54] STABILIZATION AND FIRING CIRCUIT FOR A POWER SOURCE OF A CUTTING OR WELDING SYSTEM AND METHOD OF STABILIZING AND FIRING SAME

[75] Inventor: Richard A. Eldridge, Florence, S.C.

[73] Assignee: ESAB Group, Inc., Florence, S.C.

[21] Appl. No.: 582,203

[22] Filed: Jan. 2, 1996

Related U.S. Application Data

[63] Continuation-in-part of Ser. No. 580,957, Dec. 29, 1995.
[51] Int. Cl.$^6$ .................................................... B23K 9/06
[52] U.S. Cl. ................................ 219/130.4; 219/130.1
[58] Field of Search ........................... 219/130.4, 130.1, 219/130.32, 130.5, 130.51, 137 PS

[56] References Cited

U.S. PATENT DOCUMENTS

| | | |
|---|---|---|
| Re. 31,486 | 1/1984 | Helmuth . |
| 3,068,352 | 12/1962 | Correy . |
| 4,038,515 | 7/1977 | Risberg . |
| 4,371,776 | 2/1983 | Winn . |
| 4,459,460 | 7/1984 | Ogilvie et al. . |
| 4,764,857 | 8/1988 | Konopka . |
| 4,767,912 | 8/1988 | Eldridge . |
| 5,308,952 | 5/1994 | Bunker et al. ............... 219/130.4 |
| 5,338,916 | 8/1994 | Blankenship et al. . |
| 5,349,157 | 9/1994 | Blankenship ............. 219/130.32 |

FOREIGN PATENT DOCUMENTS

| | | |
|---|---|---|
| 0023348A1 | 2/1981 | European Pat. Off. . |

*Primary Examiner*—Clifford C. Shaw
*Attorney, Agent, or Firm*—Bell Seltzer Intellectual Property Law Group of Alston & Bird, LLP

[57] ABSTRACT

The cutting or welding system includes a power source having, in one embodiment, a stabilization circuit for reducing arc rectification and, in another embodiment, a number of firing circuits for controlling the flow of current through a rectifier in order to more precisely provide a rectified alternating current. The power source also includes a rectifier having a number of current control devices for providing rectified current having alternating positive and negative cycles across the arc gap. Accordingly, the electrode alternates between an electrode negative state and an electrode positive state, respectively. In one embodiment, the stabilization circuit extends across the arc gap and includes an energy storage device and a current control device in series with the energy storage device for blocking current flow to the energy storage device in the electrode negative state such that the energy storage device remains uncharged and for allowing current flow to the energy storage device in the electrode positive state such that the energy storage device rapidly charges from an uncharged state to a charged state upon switching the electrode to the electrode positive state. In another embodiment, the firing circuits are connected to the control electrodes of respective current control devices of the rectifier wherein said current control devices provide a continuous firing current to the control electrode once the firing current control device has been actuated to thereby increasing the reliability of the rectifier.

29 Claims, 7 Drawing Sheets

5,753,888

STABILIZATION AND FIRING CIRCUIT FOR A POWER SOURCE OF A CUTTING OR WELDING SYSTEM AND METHOD OF STABILIZING AND FIRING SAME

RELATED APPLICATION

This application is a continuation-in-part of U.S. patent application Ser. No. 08/580,957 filed Dec. 29, 1995, and entitled STABILIZATION AND FIRING CIRCUIT FOR A POWER SOURCE OF A CUTTING OR WELDING SYSTEM AND METHOD OF STABILIZING AND FIRING SAME, the contents of which are expressly incorporated in their entirety herein.

FIELD OF INVENTION

This invention relates to a cutting or welding apparatus and, more particularly, to an apparatus and method for stabilizing and firing a power source of a cutting or welding system.

BACKGROUND OF THE INVENTION

Electric arc welders are typically employed to cut or weld metal workpieces and can be generally categorized into three basic types, namely, manual electroslag or "stick electrode" arc welders, Metal-Inert Gas ("MIG") welders and Tungsten-Inert Gas ("TIG") welders. With conventional stick electrode arc welding, a consumable coated rod or stick of metal is placed adjacent to the workpieces being welded and an arc is generated between the electrode and the workpiece to form a weld bead and join the workpieces together. The heat of the arc transfers filler metal from the electrode to the workpiece and the weld bead is formed. After the electrode has been used to its fullest, it must be replaced with a new electrode. Similarly, with MIG welding, a consumable metal wire forms the filler and is continually fed to the arc. In addition, an inert or slightly oxidizing gas is supplied to shield the arc from the atmosphere and improve the metallurgical qualities of the weld. In contrast, TIG welding uses a non-consumable tungsten electrode and filler material may be supplied by way of an adjacent consumable rod.

Regardless of the type of electric arc welder, the cutting or welding system also includes a power source electrically connected to the workpiece for generating the desired arc. The power source includes an input line which is connected to a conventional supply of electric power, such as household or industrial alternating current. The power source also generally includes a pair of output terminals. One of the terminals is connected to the welding or cutting torch, and the other terminal is connected to the workpiece to complete or close a circuit with the power source. The power source may have an analog meter associated with the power source for setting or adjusting the arc voltage from the power source.

During initial setup for system operation, the system operator preferably presets the amount of cutting or welding current and the amount of gas and water flow into the torch. During system operation, for example, the power source generates a cutting or welding current to an electrode of the torch, a flow of gas is generated between the electrode and a nozzle assembly of the torch, and an electrical arc is generated extending from the electrode through a bore of a nozzle assembly of the torch into contact with a workpiece positioned beneath the nozzle assembly. The operator then manually adjusts the cutting or welding current to compensate for load changes which occur through process parameter changes such as changes in plate thickness, changes in plasma gas flow, changes in the distance from the plate to the torch, and changes in the gas and water flows into the torch.

As described in U.S. Pat. No. 4,038,515 to Robert L. Risberg, the contents of which are incorporated herein by reference, the electrical arc of conventional cutting or welding torches is generally formed by a cyclical welding current having positive and negative portions. During the positive portion (also known as the clean portion or the electrode positive state), electrons flow from the workpiece to the electrode and, consequently, current flows from the electrode to the workpiece to thereby clean the workpiece. In contrast, during the negative portion (also known as the weld portion or the electrode negative state), electrons flow from the electrode to the workpiece and, consequently, current flows from the workpiece to the electrode to thereby weld or cut the workpiece.

The AC welder of the Risberg '515 patent includes a full bridge having a silicon controlled rectifier ("SCR") in each arm of the bridge and an inductor extending between opposed arms of the bridge in order to convert a single phase input voltage into a square wave AC welding current. The AC welder of the Risberg '515 patent also provides a firing control circuit for controlling the firing of respective ones of the SCR's such that the respective widths of the positive and negative portions of the cyclical welding current can be adjusted to thereby control the duty cycle of the alternating welding current and, correspondingly, to control the relative percentages of electrical arc which clean the workpiece and which weld or cut the workpiece. See also U.S. Pat. No. 4,371,776 to Jackie L. Winn.

Conventional arc welders which include a rectifier having a number of SCR's configured in a bridge circuit also generally have a firing control circuit for controlling the firing of the SCR's which, in turn, regulate the flow of current through the rectifier. Typically, the firing control circuits include a pulse transformer which provides a pulse to the gate electrode of a respective SCR. While the pulse transformer will effectively fire the SCR if the SCR is appropriately biased at the time of the pulse, the pulse generator will not fire the SCR if the SCR is not appropriately biased at the time of the pulse. In the absence of additional pulses, the SCR will not fire or conduct during the remainder of the half cycle even if the SCR should subsequently become appropriately biased. Thus, the electrical arc generated by the cutting or welding system may be degraded due to this failure to properly fire one or more of the SCR's.

As known to those skilled in the art and as described in U.S. Pat. No. 5,338,916 to George D. Blankenship et al., the contents of which are incorporated herein by reference, the electrode and a metallic workpiece have different abilities to emit electrons. In particular, the electrode generally emits electrons much more readily than does a metallic workpiece and, more specifically, than does a workpiece formed of aluminum, aluminum alloys or similar metals. Thus, during the electrode negative state in which electrons flow from the electrode to the workpiece, the cutting or welding system can readily create and maintain the electrical arc between the electrode and the workpiece. However, during the electrode positive state in which electrons flow from the workpiece to the electrode, the tendency of the workpiece and, in particular, a workpiece formed of aluminum or aluminum alloy to emit electrons poorly can result in non-conduction or poor conduction of current across the arc gap. This non-conduction or poor conduction during the electrode positive state is typically termed "arc rectification" and can produce a weld having somewhat lower quality.

Arc rectification is typically most prevalent while switching from the electrode negative state to the electrode positive state and, in some instances, the electrical arc may fail to conduct, at least initially. Accordingly, the power source of some electrical arc welders have included a high frequency generator, typically controlled by a microprocessor or other control device, for producing one or more high frequency pulses across the arc gap while switching from one state to another, such as from the electrode negative state to the electrode positive state, to assure the creation of an electrical arc across the arc gap. Although the use of high frequency pulses across the arc gap when switching from one state to another does improve the performance of electrical arc welders by reducing arc rectification, arc rectification can still occur when switching states, such as from the electrode negative state to the electrode positive state.

In order to further reduce arc rectification, the electric arc welder of the Blankenship '916 patent includes an auxiliary stabilizing circuit disposed across the arc gap. The auxiliary stabilizing circuit includes a capacitor for assisting the ignition of the electrical arc across the arc gap when switching from an electrode negative state to an electrode positive state. A diode and a resistor are arranged in parallel in order to alternately charge and discharge the capacitor. In particular, the diode and resistor are connected in series with the capacitor such that, upon switching to the electrode positive state, the capacitor can charge through the diode. While the relatively high voltage across the arc gap may ignite the electrical arc, the electrical arc welder of the Blankenship '916 patent also provides a high frequency pulse. Upon ignition of the electrical arc, the capacitor partially discharges through the resistor to a voltage equivalent to the arc voltage. Likewise, upon switching to the electrode negative state, the capacitor can charge to a relatively large negative voltage. Upon ignition of the electrical arc in the electrode negative state, the capacitor again partially discharges through the resistor to a voltage equivalent to the arc voltage.

Since the capacitor is maintained at a voltage equivalent to the arc voltage following ignition of the electrical arc in both the electrode negative and positive states, the capacitor, upon switching between the electrode negative and positive states, must charge from the arc voltage of the previous state to a relatively large voltage, of opposite polarity to the previous arc voltage. As will be apparent to those skilled in the art, the time required to charge the capacitor can directly effect the transition time between the electrode negative and positive states. As will also be apparent to those skilled in the art, the transition time between the electrode negative and positive states is preferably minimized in order to provide a relatively continuous electrical arc with a minimum amount, if any, of arc rectification.

In addition, the auxiliary stabilizing circuit of the Blankenship '916 patent and, more particularly, the capacitor can act as an energy drain without any substantial improvement in arc reignition at lower current levels. Thus, the auxiliary stabilizing circuit is preferably removed, such as by opening a relay which interconnects the stabilizing circuit to the remainder of the power source, at lower current levels.

SUMMARY OF THE INVENTION

It is therefore an object of the present invention to provide a power source for a cutting or welding system which includes a stabilization circuit for improving the transition time between the electrode negative and positive states.

It is another object of the present invention to provide a power source for a cutting or welding system which includes a stabilization circuit for further reducing, if not eliminating, arc rectification during the transition between the electrode negative and positive states.

It is yet another object of the present invention to provide a power source for a cutting or welding system which includes a stabilization circuit which stabilizes the electrical arc at both relatively high and relatively low current levels.

It is a further object of the present invention to provide a power source for a cutting or welding system which includes a rectifier and an associated firing circuit which more reliably fires the current control devices of the rectifier to thereby support a high quality electrical arc.

These and other objects are provided, according to the present invention, by a cutting or welding system which includes a power source having, in one embodiment, a stabilization circuit for reducing arc rectification and, in another embodiment, a plurality of firing circuits for controlling a flow of current through a rectifier in order to more precisely provide a rectified alternating current. By reducing arc rectification and by more precisely controlling the flow of current through a rectifier, the cutting or welding system and associated methods of the present invention can reliably provide a weld of relatively high quality.

The cutting or welding system includes an arc torch having at least one electrode and means for creating an electrical arc extending across an arc gap defined between the electrode and a workpiece. The cutting or welding system also includes a power source for supplying power to the arc torch. The power source includes a transformer having a primary side connected to an external power supply and a secondary side. The power source also includes a rectifier connected to the secondary side for providing rectified current having alternating positive and negative cycles across the arc gap. Accordingly, the electrode alternates between an electrode negative state in which current flows from the workpiece to the electrode and an electrode positive state in which current flows from the electrode to the workpiece.

The rectifier of the power source of the present invention generally includes a plurality of current control devices and an inductor which extends therebetween to define first and second current paths through which the rectified current alternately flows. In addition, each current control device includes a control electrode for regulating current flow therethrough. In one embodiment, the current control devices are thyristors disposed in a bridge configuration. According to this embodiment, the rectifier further includes an inductor which extends between the thyristors to thereby define the first and second current paths for alternately conducting current during the electrode negative and electrode positive states, respectively.

In one embodiment, the power source also includes a stabilization circuit which extends across the arc gap for instantaneously providing a low impedance current path during the transition from the electrode negative state to the electrode positive state, thereby decreasing arc rectification. The stabilization circuit includes an energy storage device, such as a capacitor, and first and second current control means connected in series with the energy storage device. The first current control means blocks current flow to the energy storage device in the electrode negative state such that the energy storage device remains uncharged. In contrast, the second current control means allows current flow to the energy storage device in the electrode positive state such that the energy storage device rapidly charges from an uncharged state to a charged state upon switching the electrode from the electrode negative state to the electrode positive state. In one embodiment, both the first and second current control means are a current control device, such as a diode or a thyristor.

During the time required to charge the energy storage device, current is momentarily diverted from the previously conducting current control devices of the rectifier such that these current control devices cease conducting and the energy stored by the inductor discharges across the arc gap to thereby reduce arc rectification during the electrode positive state. In addition, by rapidly charging from an uncharged state to a charged state upon switching of the electrode from the electrode negative state to the electrode positive state, the stabilization circuit of this embodiment of the present invention improves, i.e., decreases, the transition time between the electrode negative and positive states. Accordingly, the stabilization circuit effectively reduces, if not eliminates, arc rectification during the transition from the electrode negative state to the electrode positive state. Since the stabilization circuit reduces, if not eliminates, arc rectification at both relatively high and relatively low current levels, the resulting weld produced by the cutting or welding system of the present invention is consistently of relatively high quality.

According to another advantageous embodiment, the power source can also include a plurality of firing circuits operatively connected to the control electrodes of respective current control devices of the rectifier. Each firing circuit includes firing current control means, such as a firing current control device and, more particularly, such as an optical silicon controlled rectifier, for providing a continuous firing current to the control electrode once the firing current control device has been actuated. In particular, the firing current control device is adapted to provide a continuous firing current to the control electrode of the respective current control device of the rectifier during the remainder of the cycle of the alternating current at least until the respective current control device becomes conductive. The power source of this embodiment also includes a power controller for actuating the firing current control device in a predetermined sequence such that current alternately flows through the first and second current paths defined by the rectifier.

By continuously providing firing current to the control electrode of the respective current control devices of the rectifier following actuation of the firing current control device, the current control device can be fired at any time during the remainder of the half cycle of the alternating current. Thus, the current control device will not fail to conduct for an entire half cycle merely because the current control device was not appropriately biased at the time of actuation of the firing current control device. Instead, if the current control device of the rectifier becomes appropriately biased at any time during the remainder of the half cycle of the alternating current following the actuation of the firing current control device, the current control device of the rectifier will be fired to thereby improve the reliability of the electrical arc and the quality of the resulting weld.

According to one advantageous embodiment, at least one firing circuit associated with a current control device of each of the first and second current paths further includes a gating device, such as a varistor, connected in parallel with the respective firing current control device. The gating devices effectively protect the respective firing current control devices from voltages exceeding a predetermined critical voltage, thereby further improving the reliability of the power source of the present invention.

BRIEF DESCRIPTION OF THE DRAWINGS

Some of the features and advantages of the present invention having been stated, others will become apparent as the description proceeds when taken in conjunction with the accompanying drawings, in which.

DETAILED DESCRIPTION OF THE PREFERRED EMBODIMENTS

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
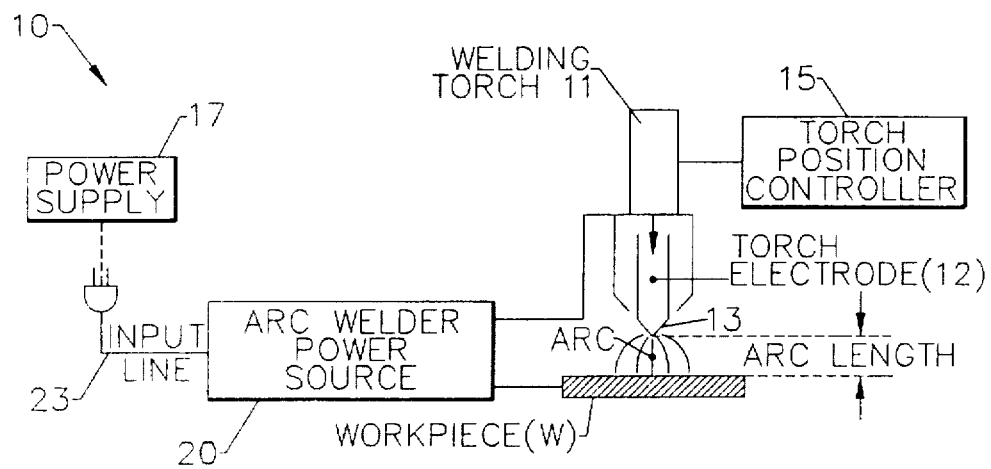
FIG. 1 is a schematic diagram of a cutting or welding system which includes an arc torch and a power source according to one embodiment of the present invention.

FIG. 1 schematically illustrates a cutting or welding system 10 according to an embodiment of the present invention. As understood by those skilled in the art, the cutting or welding system 10 preferably has at least a cutting or welding torch (e.g., an arc torch) 11 preferably including at least an electrode 12 having an arc discharge end 16. The torch 11 may also include means (e.g., switch or plasma gas flow) for creating an electrical arc extending across an arc gap defined between the electrode to a workpiece W, and a cutting or welding power source 20 operatively connected to the electrode 12 of the arc torch 11 for supplying power to the arc torch 11.

The cutting or welding system 10 of the present invention can be either manually or automatically controlled. Thus, in the embodiments of the present invention in which the cutting or welding system is automatically controlled, the cutting or welding system may also include an arc torch position controller 15 which is operatively connected to the torch 11 for controlling the position of the torch 11 in a relatively automated manner. As known to those skilled in the art, a torch position controller typically provides precise control over the position, movement, and acceleration of the torch to enable precision cutting or welding of a workpiece W.

Figure 2:
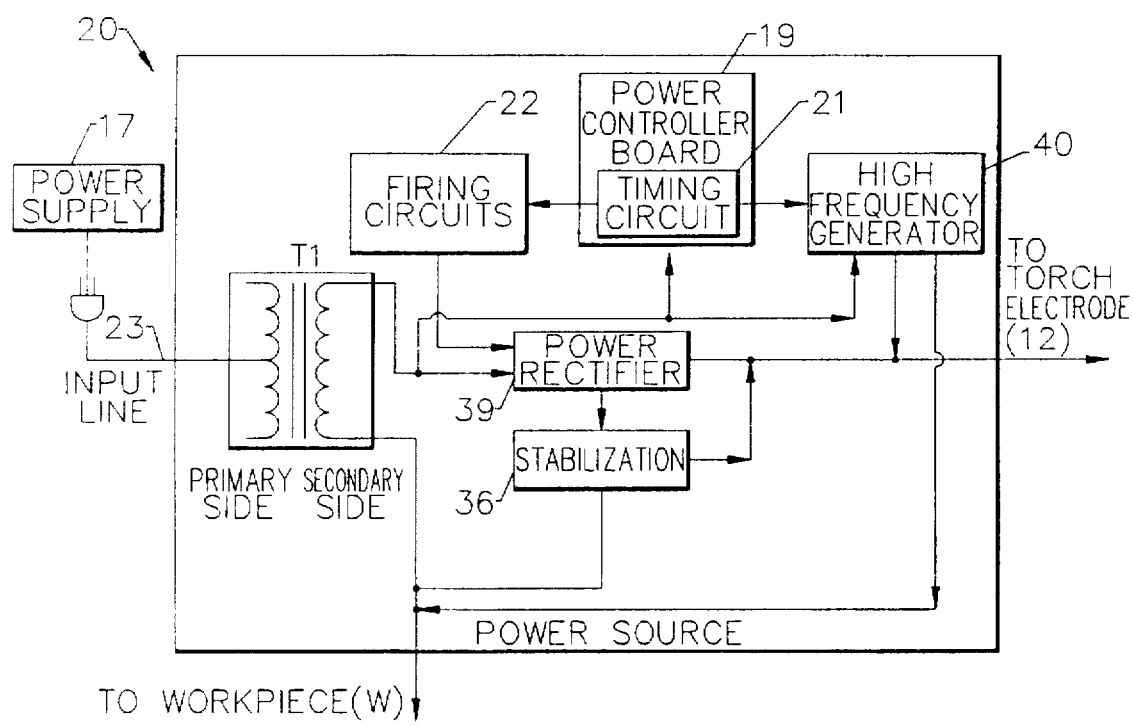
FIG. 2 is a schematic block diagram of a power source according to one embodiment of the present invention.
Figure 8:
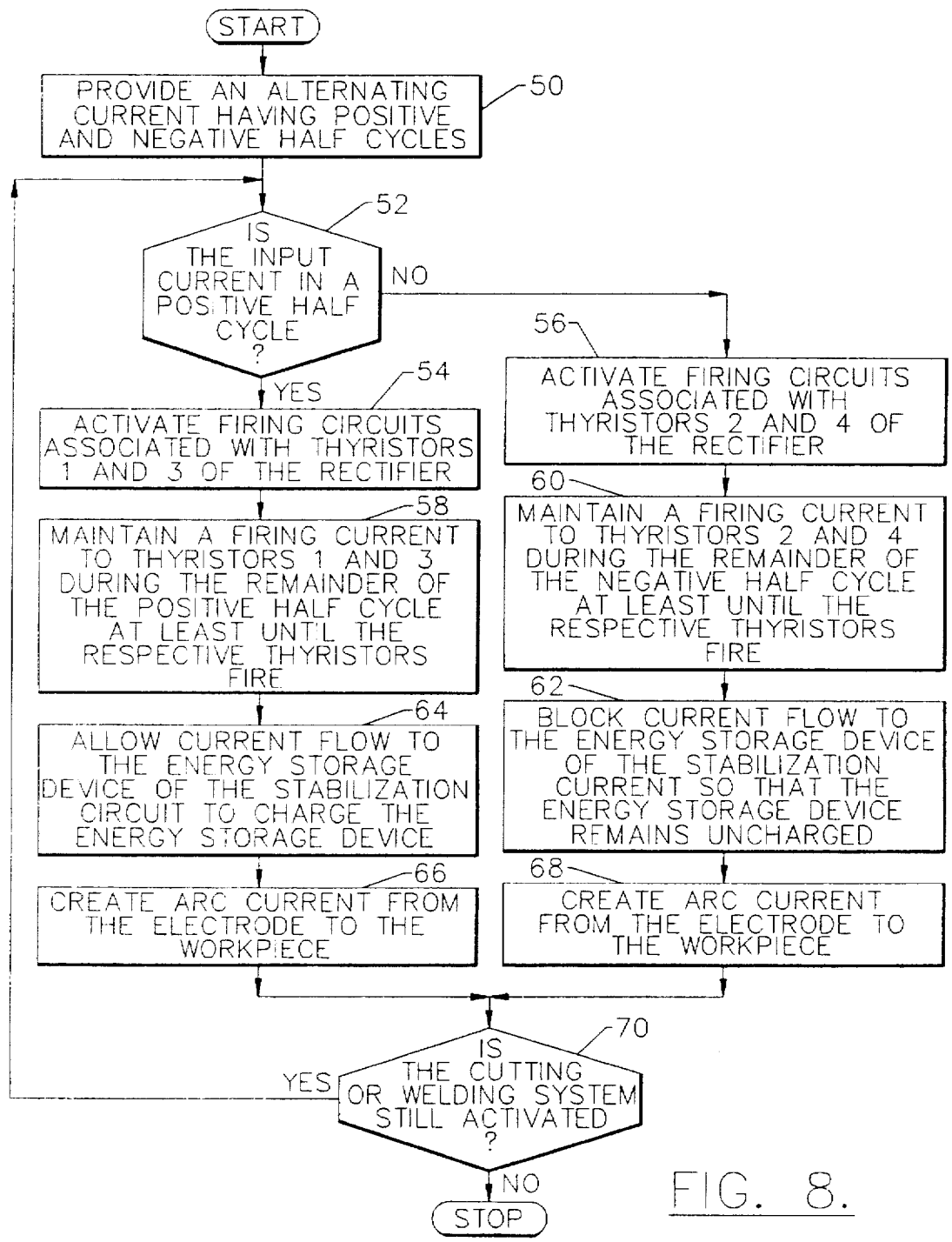
FIG. 8 is a schematic block diagram illustrating the operations performed by the stabilization and firing circuits of a power source of a cutting or welding system according to one embodiment of the present invention.

As shown in FIGS. 1 and 2 and block 50 of FIG. 8, the cutting or welding power source 20 according to the present invention preferably includes an electrical input line 23 which is operatively connected to an external power supply 17, such as conventional household or industrial supply current, to provide an alternating current having positive and negative half cycles. The input line 23 preferably is also operatively connected to a changeover terminal board (not shown) which allows for supply currents of various voltages and phase configurations to be used, which is especially useful, for example, when the power source 20 is used in countries having different types of supply current, i.e., supply current having a different amperage or frequency. Various connectors on the changeover terminal board are preconfigured depending upon the supply current used to ensure that the proper voltage and current levels are provided at the output terminals of the power source 20.

The supply current from the external power supply is passed from the changeover terminal board to a transformer T1. As understood by those skilled in the art, the electrical components of the power source leading to the transformer T1 are considered to be on the primary side of the transformer T1, whereas the electrical components downstream of the transformer T1 are considered to be on the secondary side thereof. The transformer T1 transforms the high voltage-low amperage supply current on the primary side to a low voltage-high amperage current on the secondary side, which is generally more desirable for cutting or welding operations.

As shown in FIG. 2, the current from the secondary side of the transformer T1 is then passed to a rectifier or a rectifier circuit 39, where it is converted from alternating current to direct current, each of which have alternating negative and positive half cycles. As understood by those skilled in the art, the rectifier 39 preferably includes one or more current control devices 15 in operative connection with one or more heat sinks. The current control devices generally generate large amounts of heat when rectifying the current and direct that heat to the heat sinks. The heat sinks (not shown) preferably include a piece of heat-conductive metal, such as aluminum, provided with a plurality of vanes which increase the surface area of the heat sink and improve convective heat transfer to the ambient air.

Figure 3:
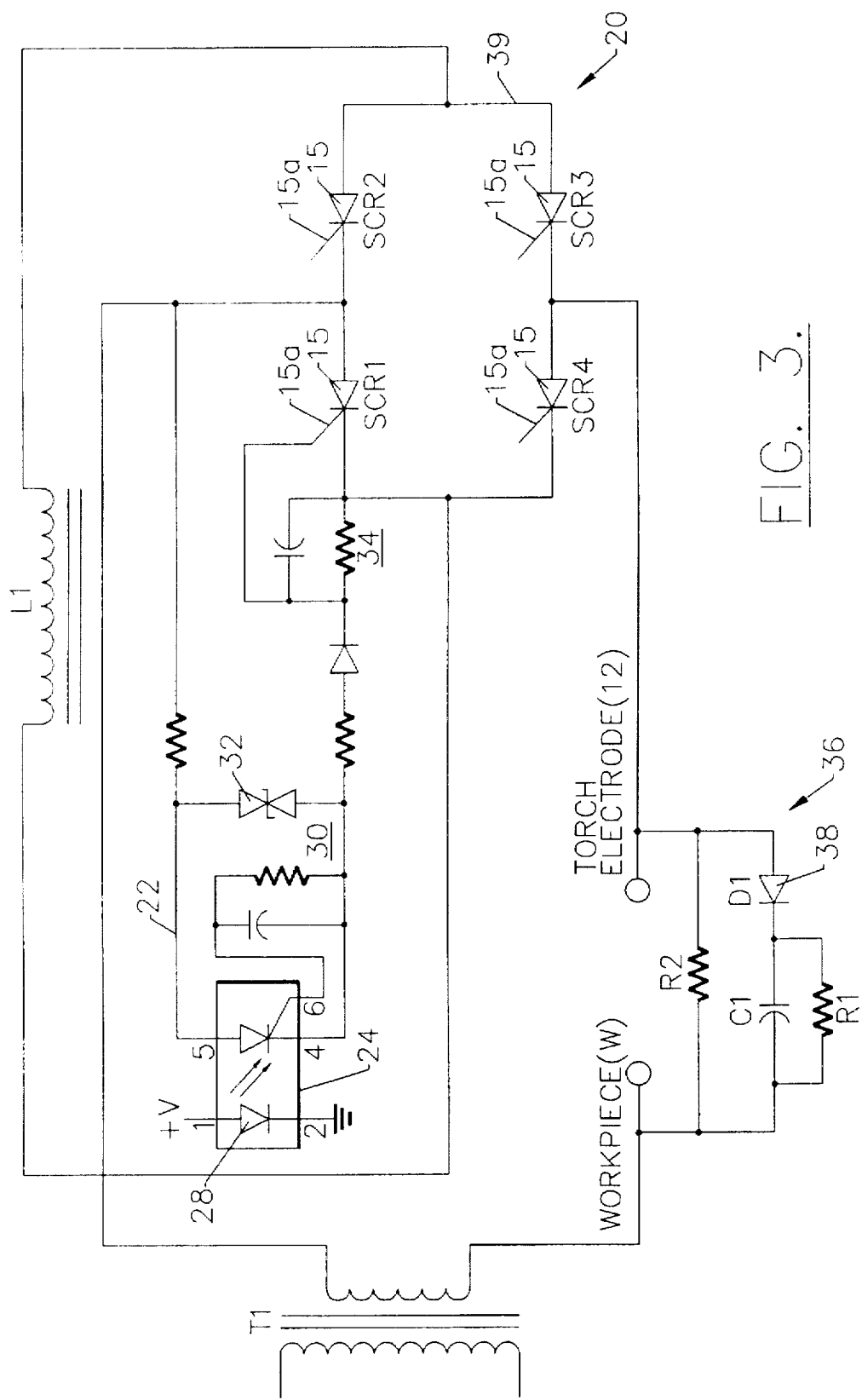
FIG. 3 is a schematic diagram of a power source for a cutting or welding system having a stabilization circuit and a firing circuit according to one embodiment of the present invention.
Figure 4:
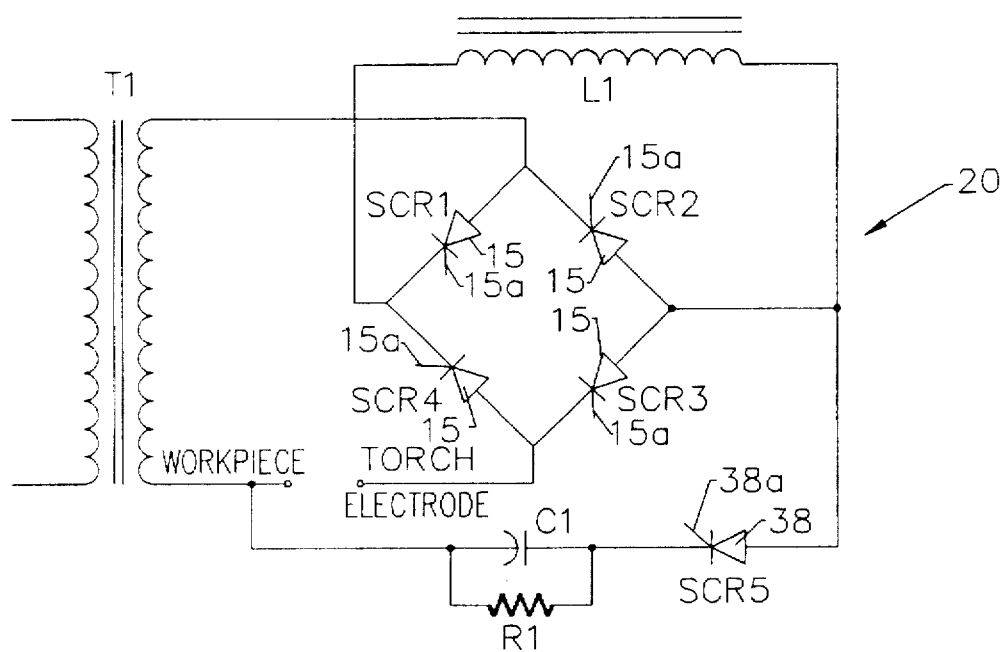
FIG. 4 is a schematic diagram of a portion of a power source for a cutting or welding system having a stabilization circuit according to another embodiment of the present invention.
Figure 5:
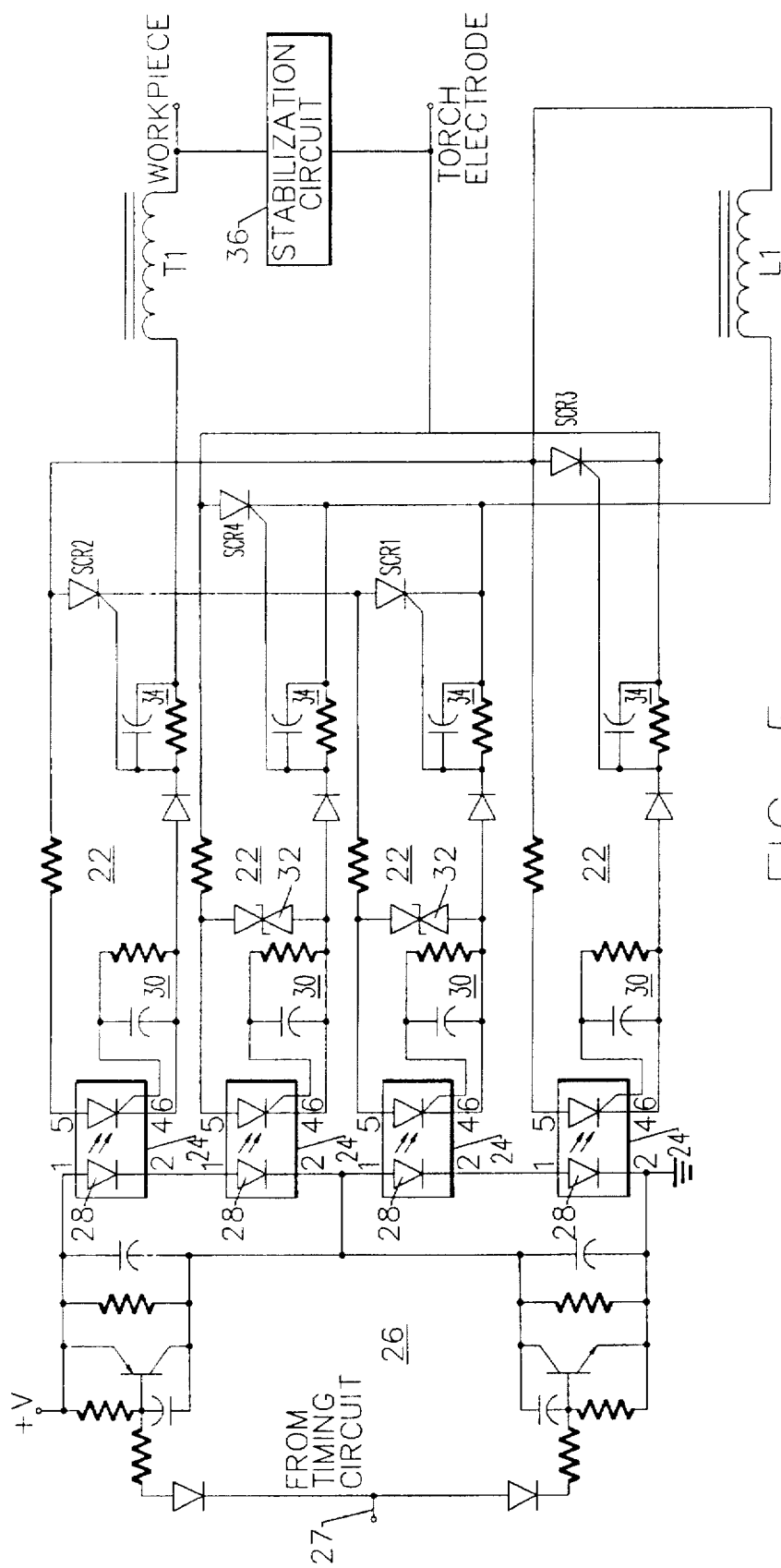
FIG. 5 is a more detailed schematic diagram of a power source for a cutting or welding system having a plurality of firing circuits which illustrates the actuation of the firing circuits according to the embodiment of the power source illustrated in FIG. 3.

As further illustrated in FIGS. 3–5, the plurality of current control device 15 of the rectifier 39 are arranged in a bridge configuration and a choke, such as an inductor L1, extends between opposing arms of the bridge to define first and second current paths through which the alternating current can flow during the positive half cycle and the negative half cycle, respectively. The current control devices are preferably power gated devices, such as thyristors and, more preferably, SCR's, which are adapted to conduct relatively large currents in one direction.

The current control devices 15 preferably include a gate or control electrode 15a for controlling the firing of the respective current control device. As known to those skilled in the art, the firing of a current control device, such as a thyristor, will enable the current control device to conduct if the current control device is appropriately biased, i.e., if the voltage at the anode of the current control device exceeds the voltage at the cathode of the current control device. According to the present invention, the power source 20 preferably includes a power controller 19 for actuating or firing the current control devices of the rectifier 39 in a predetermined sequence such that current alternately flows through the first and second current paths defined therethrough.

With reference to FIGS. 3–5 and blocks 52, 54 and 56 of FIG. 8, the power controller 19 preferably fires the first and third thyristors (designated as SCR1 and SCR3) during the positive half cycle of the alternating current such that current can flow through the first current path defined by the rectifier, i.e., from the secondary side of the transformer T1, through SCR1 and through the inductor L1, through SCR3 to the electrode 12. In contrast, the power controller preferably fires the second and fourth thyristors (designated as SCR2 and SCR4) during the negative half cycle of the alternating current such that current can flow through the second current path defined by the rectifier, i.e., from the electrode, through SCR4 and through the inductor L1, through SCR2 to the secondary side of the transformer T1.

As known to those skilled in the art, the power controller 19 typically includes a microprocessor or other control device for actuating the current control devices 15 of the rectifier 39 in a predetermined sequence. As illustrated schematically in FIG. 2, the power controller also preferably includes a timing circuit 21. As also known to those skilled in the art, the timing circuit controls the respective times at which the current control devices of the rectifier are fired relative to the positive and negative half cycles of the alternating supply current. For the embodiments illustrated in FIGS. 3–5 and described above, the current control devices which, at least in part, define the first and second current paths through the rectifier are preferably fired at or slightly after the transition to the positive and negative half cycles of the alternating current, respectively.

In order to increase the reliability with which the current control devices 15 of the rectifier 39 are fired, the power source 20 of one embodiment of the present invention preferably includes a plurality of firing circuits 22 operatively connected to the control electrodes 15a of respective current control devices. While the power source as schematically illustrated in FIG. 3 only includes a firing circuit operatively connected to SCR1, a firing circuit is preferably operatively connected to each of the current control devices to control the firing thereof as shown in more detail in FIG. 5. For example, firing circuit 1 can be operatively connected between the secondary side of the transformer T1 and the control electrode of SCR1, firing circuit 2 can be operatively connected between the secondary side of the transformer and the control electrode of SCR2, firing circuit 3 can be operatively connected between the electrode and the control electrode of SCR3, and firing circuit 4 can be operatively connected between the electrode and the control electrode of SCR4. In addition, while the alternative embodiment of the power source of FIG. 4, as illustrated, does not include any firing circuits, a firing circuit as illustrated in FIGS. 3 and 5 is preferably connected to the control electrode of each current control device of the rectifier in order to control the actuation thereof in a like manner to that described in conjunction with FIG. 3.

Each firing circuit 22 preferably includes firing current control means for controllably supplying a firing current to the control electrode 15a of the respective current control device 15 of the rectifier 39 to thereby actuate or fire the respective current control device. The firing current control means preferably includes a firing current control device 24, such as a power gated device including a thyristor and, more preferably, an optical silicon controlled rectifier ("SCR"). As shown schematically in FIG. 2 and in more detail in FIG. 5, the power controller 19 preferably actuates the firing current control devices associated with respective current control devices of the rectifier according to the predetermined sequence in order to alternately conduct current along the first and second current paths defined by the rectifier.

In one exemplary embodiment illustrated in FIG. 5, the power controller 19, including the timing circuit 21, is operatively connected to the firing circuits 22 and, more particularly, the firing current control devices 24 of the firing circuits via a power supply circuit 26 which allows the timing circuit to simultaneously trigger or actuate two of the firing circuits. As shown, a bias supply voltage +V is provided by the power controller and is switchably connected to each of the firing circuits via the power supply circuit. The timing circuit can alternately connect the bias supply voltage to firing circuits 2 and 4 to provide a firing current to SCR2 and SCR4 which, in turn, define the second current path through the rectifier 39, and to firing circuits 1 and 3 to provide a firing current to SCR1 and SCR3 which, in turn, define the first current path through the rectifier. Thus, the power controller and, more particularly, the timing circuit can alternately actuate SCR2 and SCR4 by providing a positive voltage to the power supply circuit of FIG. 5 at node 27, and SCR1 and SCR3 by providing a negative voltage to the power supply circuit at node 27.

As illustrated in FIGS. 3 and 5, the firing current control device 24 preferably includes an optically driven SCR to effectively isolate the remainder of the firing circuit 22 from the power controller 19 and the power supply circuit 26. While the LED 28 of the optical SCR is shown extending between +V (pin 1) and a reference voltage (pin 2), such as ground, the LED is generally switchably connected to the bias supply voltage +V via the power supply circuit as shown in FIG. 5. As shown in FIGS. 3 and 5, the optical SCR also has a control electrode (pin 6) which can be connected to its cathode (pin 4) via a parallel RC network 30 in order to remain appropriately biased.

Following actuation, the firing current control device 24 of the present invention is preferably driven continuously during the remainder of the present half cycle of the alternating current, such as by the power supply circuit 26 of FIG. 5. Accordingly, the firing current control device can supply a continuous firing current to the control electrode 15a of the respective current control device 15 of the rectifier 39 during the remainder of the present half cycle of the alternating current as indicated by blocks 58 and 60 of FIG. 8. The continuous actuation of the firing current control device and, in turn, the continuous actuation or firing of the respective current control device of the rectifier can be terminated or halted, however, once the respective current control device fires or latches and begins to conduct.

By continuously providing firing current to the control electrode 15a of the respective current control devices 15 of the rectifier 39 following actuation of the associated firing current control device 24, the current control device can be fired at any time during the remainder of the present half cycle of the alternating current. Thus, the current control device will not fail to conduct for an entire half cycle merely because the current control device was not appropriately biased at the time of actuation of the firing current control device. Instead, if the current control device of the rectifier becomes appropriately biased at any time during the remainder of the half cycle of the alternating current following the actuation of the firing current control device, the current control device of the rectifier will be fired to thereby improve the reliability of the electrical arc and the quality of the resulting weld.

The firing circuit 22 can also include a gating device 32 connected in parallel with the respective firing current control device 24 to protect the firing current control device from voltages exceeding a predetermined maximum or critical voltage, such as 400 Volts. In one embodiment, the gating device is a varistor, such as a metal oxide varistor ("MOV"), which avalanches at voltages above the predetermined critical voltage. Accordingly, the gating device can protect the respective firing current control device, such as from a collapsing field in the inductor L1 which may be due to a failure of the electrical arc to breakdown.

While each firing circuit 22 may include a gating device 32, such as a MOV, only one of the firing circuits associated with the current control devices 15 which define the first current path, i.e., SCR1 and SCR3, and only one of the firing circuits associated with the current control devices which define the second current path, i.e., SCR2 and SCR4, need to include a gating device in order to effectively protect all of the firing circuits from overvoltage conditions. Thus, in one advantageous embodiment illustrated in FIG. 5, firing circuit 1 and firing circuit 4 include gating devices, such as MOV's, while firing circuit 2 and firing circuit 3 do not include gating devices. However, other combinations of the firing circuits or all of the firing circuits can include gating devices without departing from the spirit and scope of the present invention.

As shown in FIGS. 3 and 5, each firing circuit 22 can also include one or more resistors and diodes on the lines interconnecting the firing circuit to the rectifier 39. In addition, a noise suppression circuit 34 formed of a parallel RC network can be disposed between the firing circuit and the rectifier in order to reduce the transmission of noise therebetween.

As a result of the rectified alternating current provided by the rectifier 39 via the first and second current paths, the electrode 12 alternates between an electrode positive state in which current flows from the electrode to the workpiece W, and an electrode negative state in which current flows from the workpiece to the electrode, respectively. In order to reduce, if not eliminate, arc rectification, particularly during the transition from the electrode negative state to the electrode positive state, the power source 20 of one advantageous embodiment also includes a stabilization circuit 36 as described below.

As shown in FIGS. 3 and 4, the stabilization circuit 36 of this embodiment of the present invention is operatively connected between the rectifier 39 and the electrode 12 and extends across the arc gap for stabilizing the electrical arc across the arc gap and, correspondingly, reducing arc rectification. As also shown, the stabilization circuit includes an energy storage device C1, such as a capacitor, and first and second current control means in series with the energy storage device. The first current control means blocks current flow to the energy storage device in the electrode negative state such that the energy storage device remains uncharged as indicated by block 62 of FIG. 8. In contrast, the second current control means allows current flow to the energy storage device in the electrode positive state such that the energy storage device rapidly charges from an uncharged state to a charged state upon switching the electrode from the electrode negative state to the electrode positive state as indicated by block 64 of FIG. 8.

In one embodiment, both the first and second current control means are a single current control device 38. As shown in FIG. 3, the current control device can, in turn, be a diode D1 having an anode operatively connected to the rectifier 39 and an opposed cathode operatively connected to the energy storage device C1. Alternatively, the current control device can be a power gated device, such as a thyristor and, more typically, an SCR (designated SCR5) having an anode operatively connected to the rectifier and an opposed cathode operatively connected to the energy storage device as illustrated in the alternative embodiment of the power supply of FIG. 4. Although not shown in FIG. 4, the gate or control electrode 38a of the current control device of this embodiment, i.e., SCR5, can be driven during the positive half cycle during which SCR1 and SCR3 are conducting. Thus, the control electrode of the current control device of this embodiment, i.e., SCR5, can be operatively connected to and driven by the firing circuit 22 which is associated with either SCR1 or SCR3 in order to be actuated simultaneous therewith.

Regardless of the type of current control device 38 employed by the stabilization circuit 36, upon switching to the electrode positive state, the stabilization circuit momentarily provides a low impedance current path so as to divert current from the current control devices 15 of the rectifier 39 which were previously conducting during the electrode negative state, i.e., SCR2 and SCR4. Accordingly, these previously conducting current control devices cease conducting and, as a result, the energy stored by the inductor L1 of the rectifier will discharge across the arc gap to ignite an electrical arc thereacross. Thus, the stabilization circuit of this embodiment of the present invention effectively reduces arc rectification, particularly during the transition to the electrode positive state. In order to illustrate the operation of the stabilization circuit, the relationship of the voltage across the secondary side of the transformer $V_{SEC}$, the arc current $I_{ARC}$ and the voltage across the energy storage device of the stabilization circuit $V_{C1}$ are graphically depicted in FIGS. 6A–C, respectively.

Figure 6A:
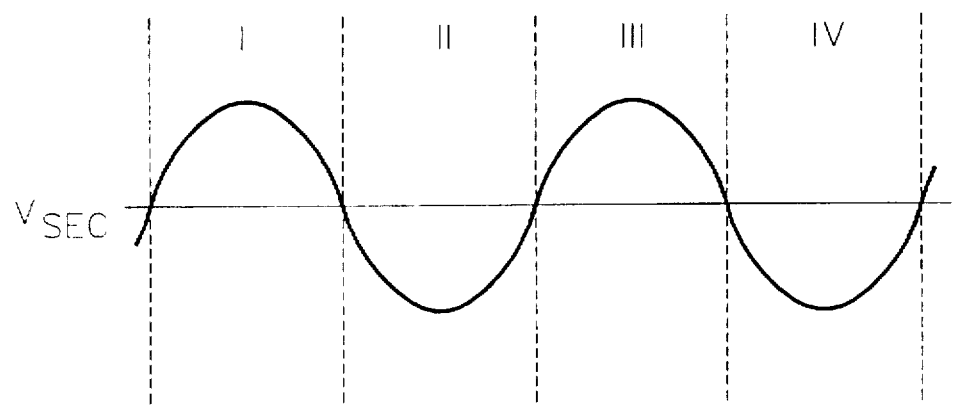
FIGS. 6A–C graphically illustrate the relationship of the voltage across the secondary of the transformer, the arc current and the voltage across the energy storage device of the stabilization circuit of one embodiment of the present invention, respectively.

As shown in FIG. 6A, the voltage across the secondary side of the transformer $V_{SEC}$ is typically sinusoidal so as to have alternate positive half cycles as depicted in Regions I and III and negative half cycles as depicted in Regions II and IV. As explained in more detail hereinafter, the electrode 12 is generally in an electrode positive state during the positive half cycles of the alternating supply voltage as shown in Regions I and III of FIG. 6B in which arc current flows from the electrode to the workpiece W as indicated in block 66 of FIG. 8. In contrast, the electrode is generally in an electrode negative state during the negative half cycles of the alternating supply voltage as shown in Regions II and IV of FIG. 6B in which arc current flows from the workpiece to the electrode as depicted in block 68 of FIG. 8.

Figure 6B:
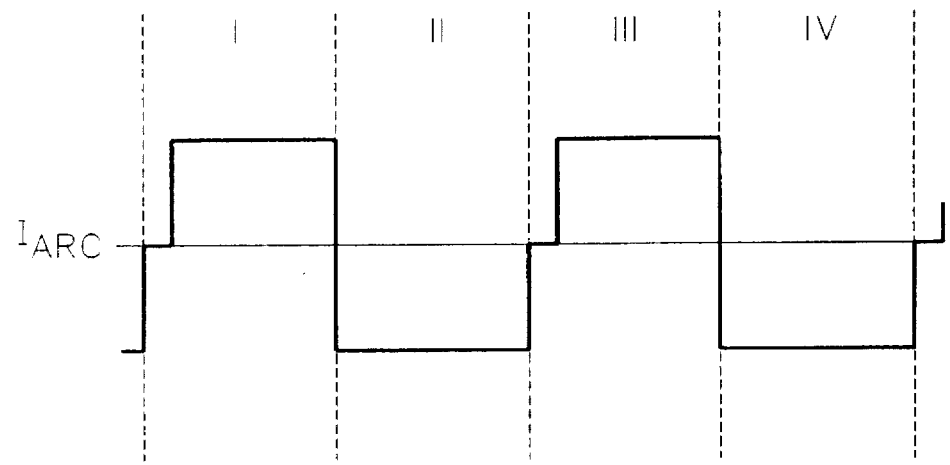
Figure 6C:
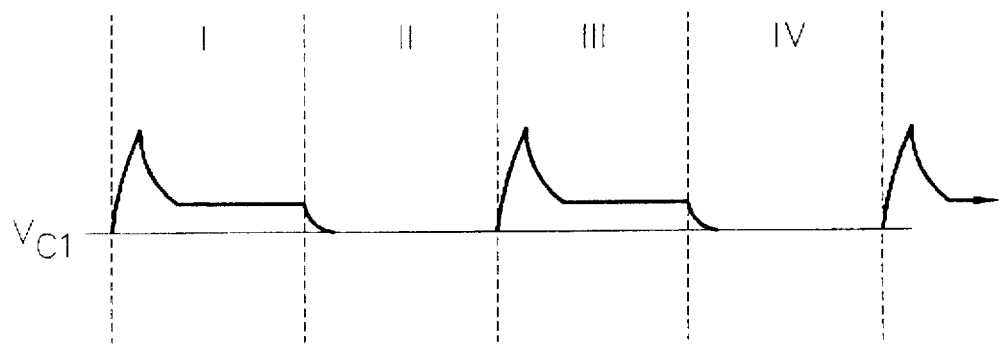

Upon switching from the electrode negative state to the electrode positive state, the voltage $V_{C1}$ across the energy storage device C1 of the stabilization circuit 36 increases exponentially from an uncharged state to a charged state as shown in Region I of FIG. 6C. As described above, the current control device 38 of the stabilization circuit is appropriately biased during the electrode positive state to conduct so as to allow current flowing through the first current path defined by the rectifier 39 to charge the energy storage device.

As also described above and as shown in FIG. 6B, the electrical arc may fail to ignite across the arc gap upon switching from the electrode negative state to the electrode positive state. However, upon the transition from the electrode negative state to the electrode positive state, the energy storage device C1, in its initial uncharged state, momentarily diverts current from the current control devices 15 of the rectifier 39 which define the second current path and which were previously conducting during the electrode negative state, i.e., SCR2 and SCR4. Accordingly, these previously conducting current control devices are force commutated off and cease conducting. As a result, the energy stored by the inductor L1 of the rectifier is discharged or directed across the arc gap so as to ignite an electrical arc thereacross during the remainder of the electrode positive state.

The stabilization circuit 36 can also include a resistive element, such as a resistor R1, disposed in parallel with the energy storage device C1. Thus, as also shown in Region I of FIG. 6C, upon ignition of an electrical arc across the arc gap by discharge of the energy stored by the inductor L1 thereacross, the energy storage device can also discharge across the resistive element to reduce the accumulated charge to a level approximately equal to the arc voltage during the remainder of the electrode positive state. As described, however, the energy storage device does not supply energy for creating the electrical arc by discharging across the arc gap, but, instead, force commutates the current control devices 15 of the rectifier 39 which were previously conducting during the electrode negative state, i.e., SCR2 and SCR4, such that the energy stored by the inductor L1 is discharged or directed across the arc gap, thereby igniting an electrical arc thereacross.

Upon switching from the electrode positive state of Region I to the electrode negative state of Region II, the current control device 38 of the stabilization circuit 36 effectively blocks the current flowing through the second current path defined by the rectifier 39 and does not allow the current to flow to the energy storage device C1. Accordingly, the voltage across the energy storage device of the stabilization circuit decreases exponentially to an uncharged state. In particular, the energy storage device can discharge through the resistive element R1 to an uncharged state once the current control device is reverse biased upon switching from the electrode positive state to the electrode negative state. As described above, however, the electrical arc is typically readily established across the arc gap during the electrode negative state such that the the energy storage device of the stabilization circuit need not be charged during the electrode negative state, but can, instead, remain in an uncharged state. As depicted in FIGS. 6A–C, the cutting or welding system 10 of the present invention can continue to alternate between the electrode negative state and the electrode positive state until the cutting or welding operations are completed as shown in block 70 of FIG. 8.

Due to the configuration of the stabilization circuit 36 of this embodiment of the present invention, the voltage across the stabilization circuit and, more particularly, the voltage $V_{C1}$ across the energy storage device C1 decreases exponentially to an uncharged state and not to a negative voltage, such as the arc voltage $-E_{ARC}$, upon switching from the electrode positive state to the electrode negative state. Thus, the stabilization circuit and, more particularly, the energy storage device can rapidly charge from the uncharged state to a charged state upon switching of the electrode 12 from the electrode negative state to the electrode positive state to thereby improve, i.e., decrease, the transition time between the electrode negative and positive states.

Figure 7:
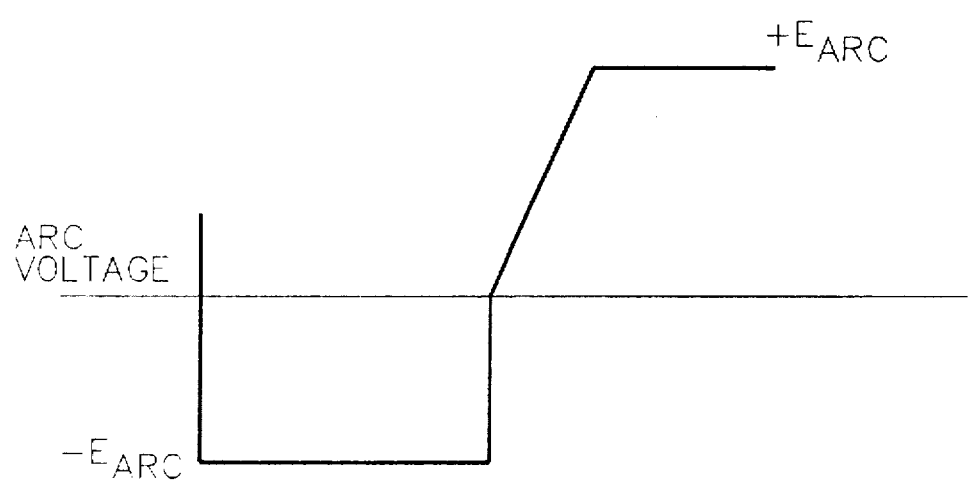
FIG. 7 graphically illustrates the arc voltage stabilization for a power source of a cutting or welding system having a stabilization circuit according to one embodiment of the present invention.

In particular, upon switching from the electrode negative state during which the voltage across the arc gap is negative, i.e., $-E_{ARC}$, to the electrode positive state during which the voltage across the arc gap is positive, i.e., $+E_{ARC}$, the voltage need not ramp gradually up from $-E_{ARC}$ to $+E_{ARC}$. Instead, since the energy storage device C1 of the stabilization circuit 36 of the present invention remains in an uncharged state during the electrode negative state, the voltage across the arc gap need only ramp up from the uncharged state to $+E_{ARC}$, as shown graphically in FIG. 7, as the voltage across the energy storage device $V_{C_1}$ increases from the uncharged state to a charged state, as shown in Regions I and III of FIG. 6C and as described above. Accordingly, the stabilization circuit of this embodiment of the present invention effectively reduces the transition time between the electrode negative and positive states and correspondingly reduces, if not eliminates, arc rectification during the transition from the electrode from the negative state to the electrode positive state. Since the stabilization circuit reduces, if not eliminates, arc rectification at both relatively high and relatively low current levels, the resulting weld produced by the cutting or welding system 10 of the present invention is consistently of relatively high quality.

As illustrated in FIG. 3, the stabilization circuit 36 can also include a preload resistor R2 operatively connected between the rectifier 39 and the electrode 12 and extending across the arc gap. Thus, the preload resistor is in parallel with both the arc gap and the serially connected energy storage device C1 and current control device 38 of the stabilization circuit. As known to those skilled in the art, conventional current control devices, such as the thyristors 15 which form the rectifier, require at least a predetermined minimum amount of current flow in order to remain conductive once the current control devices have been fired. Thus, the preload resistor provides a current path across the arc gap in instances in which no external load is placed across the arc gap, i.e., no load conditions. By completing or closing the circuit and providing for continued current flow in these no load conditions, the preload resistor ensures that the current control devices of the rectifier remain conductive for the remainder of the half cycle once they have been fired. Accordingly, if a load is thereafter placed across the arc gap, the appropriate current control devices of the rectifier still be conductive so as to support the increased current levels demanded by the load.

Further, as illustrated schematically in FIG. 2, the power source 20 of the cutting or welding system 10 of the present invention can also include a high frequency generator 40 for generating one or more high frequency pulses across the arc gap when switching states and, in particular, when switching from the electrode negative state to the electrode positive state. The high frequency pulses further assist in the creation of an electrical arc across the arc gap in order to reduce arc rectification and to improve the quality of the resulting weld.

As known to those skilled in the art and as illustrated and described in the Blankenship '916 patent, the high frequency generator 40 can include a high frequency transformer having a secondary winding disposed between the rectifier 39 and the electrode 12. In addition, the high frequency generator can be operatively connected to the power controller 19 and, more particularly, to the microprocessor or other control device of the power controller. Thus, the power controller can control the timing of the high frequency pulses generated by the high frequency generator such that the high frequency pulses are synchronized with the switching of states, such as from the electrode negative state to the electrode positive state. While a high frequency generator is oftentimes desirable, the power source 20 of the present invention need not necessarily include a high frequency generator since the stabilization circuit 36 effectively supports arcing across the arc gap and, correspondingly, reduces arc rectification as described above.

In the drawings and specification, there have been disclosed typical preferred embodiments of the invention, and, although specific terms are employed, they are used in a generic and descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

That which is claimed is:

1. A cutting or welding system comprising:
   an arc torch including at least an electrode and means for creating an electrical arc extending across an arc gap defined between the electrode to a workpiece; and
   a power source operatively connected to said arc torch for supplying power to said arc torch, said power source comprising:
   a transformer having a primary side connected to an external power supply and a secondary side;
   a rectifier operatively connected between the secondary side of said transformer and the electrode for providing a rectified alternating current across the arc gap such that the electrode alternates between an electrode negative state in which current flows from a workpiece to the electrode and an electrode positive state in which current flows from the electrode to a workpiece, wherein said rectifier comprises a plurality of first current control devices which at least partially define first and second current paths through which the rectified current alternatively flows in the electrode positive state and electrode negative state, respectively; and
   a stabilization circuit operatively connected between said rectifier and the electrode and extending across the arc gap, said stabilization circuit comprising an energy storage device, and a second current control device in series with said energy storage device, wherein said second current control device facilitates transition of said energy storage device from the electrode negative state to the electrode positive state by blocking current flow to said energy storage device in the electrode negative state such that said energy storage device remains uncharged in the electrode negative state and by allowing current flow to said energy storage device in the electrode positive state from the second path along which current flowed during the electrode negative state such that the first current control devices of the rectifier which were previously conducting in the electrode negative state cease conducting and such that said energy storage device rapidly charges from an uncharged state to a charged state upon switching the electrode from the electrode negative state to the electrode positive state thereby reducing arc rectification during the electrode positive state without allowing said energy storage device to discharge across said arc gap.

2. A cutting or welding system according to claim 1 wherein said energy storage device comprises a capacitor, and wherein said stabilization circuit further comprises a resistor in parallel with said capacitor.

3. A cutting or welding system according to claim 1 wherein said second current control device comprises a diode having an anode operatively connected to said rectifier and an opposed cathode operatively connected to said energy storage device.

4. A cutting or welding system according to claim 1 wherein said second current control device comprises a thyristor having an anode operatively connected to said rectifier and an opposed cathode operatively connected to said energy storage device.

5. A power source according to claim 1 wherein said stabilization circuit further comprises a preload resistor extending across the arc gap for conducting current thereacross in no load conditions.

6. A power source according to claim 1 wherein said rectifier comprises a plurality of thyristors disposed in a bridge configuration and having respective control electrodes for regulating current flow therethrough, wherein said rectifier further comprises an inductor extending between said plurality of thyristors to thereby define first and second current paths for alternately conducting current therethrough during the electrode negative and electrode positive states, respectively, and wherein said power source further comprises a power controller for providing power to the control electrodes of the said thyristors in a predetermined sequence such that current alternately flows through the first and second current paths during the electrode negative and positive states, respectively.

7. A cutting or welding system according to claim 6 further comprising:
- a plurality of firing circuits operatively connected to the control electrodes of respective thyristors, wherein each said firing circuit comprises a firing current control device operatively connected to the control electrode of a respective thyristor, and wherein at least one firing circuit associated with a thyristor of each of the first and second current paths further comprises a gating device connected in parallel with the respective firing current control device for protecting the respective firing current control device from voltages exceeding a predetermined critical voltage; and
- a power controller for providing power to said firing current control devices in a predetermined sequence such that current alternately flows through the first and second current paths defined by said rectifier.

8. A power source for supplying power to an electrode of an arc torch of a cutting or welding system, the power source comprising:
- a transformer having a primary side connected to an external power supply and a secondary side;
- a rectifier operatively connected between the secondary side of said transformer and the electrode for providing a rectified alternating current across an arc gap defined between the electrode and a workpiece such that the electrode alternates between an electrode negative state in which current flows from a workpiece to the electrode and an electrode positive state in which current flows from the electrode to a workpiece; and
- a stabilization circuit operatively connected between said rectifier and the electrode and extending across the arc gap, said stabilization circuit comprising an energy storage device, and a current control device in series with said energy storage device, wherein said current control device facilitates transition of said energy storage device from the electrode negative state to the electrode positive state by blocking current flow to said energy storage device in the electrode negative state such that said energy storage device remains uncharged and by allowing current flow to said energy storage device in the electrode positive state such that said energy storage device rapidly charges from an uncharged state to a charged state upon switching the electrode from the electrode negative state to the electrode positive state to thereby reduce arc rectification during the electrode positive state.

9. A power source according to claim 8 wherein said energy storage device comprises a capacitor, and wherein said stabilization circuit further comprises a resistor in parallel with said capacitor.

10. A power source according to claim 9 wherein said current control device is selected from the group consisting of a diode and a thyristor, and wherein said current control device has an anode operatively connected to said rectifier and an opposed cathode operatively connected to said energy storage device.

11. A power source according to claim 9 wherein said stabilization circuit further comprises a preload resistor extending across the arc gap for conducting current thereacross in no load conditions.

12. A power source for supplying power to an electrode of an arc torch of a cutting or welding system, the power source comprising:
- a transformer having a primary side connected to an external power supply and a secondary side;
- a rectifier operatively connected between the secondary side of said transformer and the electrode for providing a rectified alternating current across an arc gap defined between the electrode and a workpiece such that the electrode alternates between an electrode negative state in which current flows from a workpiece to the electrode and an electrode positive state in which current flows from the electrode to a workpiece; and
- a stabilization circuit operatively connected between said rectifier and the electrode and extending across the arc gap, said stabilization circuit comprising an energy storage device, and first and second current control means in series with said energy storage device for facilitating transition of said energy storage device from the electrode negative state to the electrode positive state, wherein said first current control means blocks current flow to said energy storage device in the electrode negative state such that said energy storage device remains uncharged in the electrode negative state and said second current control means allows current flow to said energy storage device in the electrode positive state such that said energy storage device rapidly charges from an uncharged state to a charged state upon switching the electrode from the electrode negative state to the electrode positive state to thereby reduce arc rectification during the electrode positive state.

13. A cutting or welding system comprising:
- an arc torch including at least an electrode and means for creating an electrical arc extending across an arc gap defined between the electrode to a workpiece; and
- a power source operatively connected to said arc torch for supplying power to said arc torch, said power source comprising:
  - a transformer having a primary side connected to an external power supply and a secondary side;
  - a rectifier operatively connected to the secondary side of said transformer for providing a rectified alternating current to the cutting or welding system, wherein said rectifier comprises a plurality of current control devices which define first and second current paths through which the rectified current alternately flows, and wherein each current control device includes a control electrode for regulating current flow therethrough;
  - a plurality of firing circuits operatively connected to the control electrodes of respective current control devices, wherein each said firing circuit comprises a firing current control device operatively connected to the control electrode of a respective current control device for providing a continuous firing current to the control electrode once said firing current control device has been actuated, and wherein at least one firing circuit associated with a current control device of each of the first and second current paths further comprises a gating device connected in parallel with the respective firing current control device for protecting the respective firing current control device from voltages exceeding a predetermined critical voltage; and a power controller for actuating said firing current control devices in a predetermined sequence such that current alternately flows through the first and second current paths defined by said rectifier.

14. A cutting or welding system according to claim 13 wherein each firing current control device comprises an optical silicon controlled rectifier.

15. A cutting or welding system according to claim 13 wherein each gating device comprises a varistor having a predetermined critical voltage and adapted to conduct at voltages above the predetermined critical voltage.

16. A cutting or welding system according to claim 13 further comprising a plurality of noise suppression circuits operatively connected between respective firing circuits and said rectifier.

17. A cutting or welding system according to claim 13 further comprising a stabilization circuit operatively connected between said rectifier and the electrode and extending across the arc gap, said stabilization circuit comprising:

an energy storage device; and a current control device in series with said energy storage device for blocking current flow to said energy storage device in the electrode negative state such that said energy storage device remains uncharged and for allowing current flow to said energy storage device in the electrode positive state such that said energy storage device rapidly charges from an uncharged state to a charged state upon switching the electrode from the electrode negative state to the electrode positive state to thereby reduce arc rectification during the electrode positive state.

18. A cutting or welding system according to claim 17 wherein said energy storage device comprises a capacitor, and wherein said stabilization circuit further comprises a resistor in parallel with said capacitor.

19. A cutting or welding system according to claim 17 wherein said stabilization circuit further comprises a preload resistor extending across the arc gap for conducting current thereacross in no load conditions.

20. A power source for supplying power to a cutting or welding system, the power source comprising:

a transformer having a primary side connected to an external power supply and a secondary side;

a rectifier operatively connected to the secondary side of said transformer for providing a rectified alternating current to the cutting or welding system, wherein said rectifier comprising a plurality of current control devices which define first and second current paths through which the rectified current alternately flows, and wherein each current control device includes a control electrode for regulating current flow therethrough;

a plurality of firing circuits operatively connected to the control electrodes of respective current control devices, wherein each said firing circuit comprises a firing current control device operatively connected to the control electrode of a respective current control device for providing a continuous firing current to the control electrode once said firing current control device has been actuated, and wherein at least one firing circuit associated with a current control device of each of the first and second current paths further comprises a gating device connected in parallel with the respective firing current control device for protecting the respective firing current control device from voltages exceeding a predetermined critical voltage; and a power controller for actuating said firing current control devices in a predetermined sequence such that current alternately flows through the first and second current paths defined by said rectifier.

21. A power source according to claim 20 wherein each firing current control device comprises an optical silicon controlled rectifier.

22. A power source according to claim 20 wherein each gating device comprises a varistor having a predetermined critical voltage and adapted to conduct at voltages above the predetermined critical voltage.

23. A power source according to claim 20 wherein said rectifier comprises:

a plurality of thyristors having respective control electrodes and disposed in a bridge configuration; and an inductor extending between said plurality of thyristors to thereby define the first and second current paths for alternately conducting current therethrough.

24. A power source for supplying power to a cutting or welding system, the power source comprising:

a transformer having a primary side connected to an external power supply and a secondary side;

a rectifier operatively connected to the secondary side of said transformer for providing a rectified current having alternating positive and negative cycles to the cutting or welding system, wherein said rectifier comprising a plurality of current control devices which define first and second current paths through which the rectified current alternately flows, and wherein each current control device includes a control electrode for regulating current flow therethrough;

a plurality of firing circuits operatively connected to the control electrodes of respective current control devices, wherein each firing circuit comprises firing current control means operatively connected to the control electrode of a respective current control device for providing a continuous firing current to the control electrode in response to actuation thereof such that the firing current flows during the remainder of the cycle of the alternating current at least until the respective current control device becomes conductive once said firing circuit has been activated; and a power controller for actuating said firing current control means in a predetermined sequence such that current alternately flows through the first and second current paths defined by said rectifier.

25. A power source according to claim 24 wherein said firing current control means of each firing circuit comprises an optical silicon controlled rectifier.

26. A power source according to claim 24 wherein at least one firing circuit associated with a current control device of each of the first and second current paths further comprises a gating device connected in parallel with the respective firing current control means for protecting the respective firing current control means from voltages exceeding a predetermined critical voltage.

27. A method for stabilizing an electrical arc across an arc gap between an electrode of an arc torch and a workpiece, the method comprising the steps of:

providing a rectified alternating current across the arc gap such that the electrode alternates between an electrode negative state in which current flows from a workpiece to the electrode and an electrode positive state in which current flows from the electrode to a workpiece; and stabilizing the electrical arc across the arc gap with an energy storage device extending across the arc gap, said stabilizing step comprising the steps of:

blocking current flow to the energy storage device in the electrode negative state such that the energy storage device remains uncharged to thereby facilitate transition of said energy storage device from the electrode negative state to the electrode positive state; and providing current to the energy storage device in the electrode positive state such that the energy storage device rapidly charges from an uncharged state to a charged state upon switching the electrode from the electrode negative state to the electrode positive state to thereby reduce arc rectification during the electrode positive state without allowing said energy storage device to discharge across the arc gap.

28. A method for firing respective ones of a plurality of current control devices of a rectifier to provide rectified alternating current to an electrode of an arc torch, the method comprising the steps of:

providing a plurality of firing circuits in operative connection with control electrodes of respective current control devices;

providing alternating current having a positive cycle and a negative cycle to the rectifier; and actuating the current control devices in a predetermined sequence such that current alternately flows through first and second current paths defined by the rectifier, said actuating step comprising the step of actuating the firing circuits in a predetermined sequence such that the firing circuits thereafter provide a continuous firing current to the control electrode of the respective current control device during the remainder of the cycle of the alternating current at least until the respective current control device becomes conductive, thereby supporting conduction by the respective current control device.

29. A method according to claim 28 further comprising the step of protecting the plurality of firing circuits from voltages exceeding a predetermined critical voltage during said step of providing the alternating voltage.

\* \* \* \* \*